(12) United States Patent
Shaheen et al.

(10) Patent No.: US 8,291,782 B1
(45) Date of Patent: Oct. 23, 2012

(54) ACTUATOR ASSEMBLY FOR STABILIZERS

(75) Inventors: Milad A. Shaheen, Rancho Santa Margarita, CA (US); Teodoro J. Landas, Walnut, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 263 days.

(21) Appl. No.: 12/571,246

(22) Filed: Sep. 30, 2009

(51) Int. Cl.
F16H 1/20 (2006.01)
F16H 29/20 (2006.01)
F16H 27/02 (2006.01)
F16H 29/02 (2006.01)

(52) U.S. Cl. ............... 74/89.26; 74/89.23; 74/89.34; 74/89.39

(58) Field of Classification Search ............ 74/89.23, 74/89.26, 89.34, 89.39; 244/99.4, 99.9, 99.2, 244/87, 90 R
See application file for complete search history.

(56) References Cited

U.S. PATENT DOCUMENTS

| 6,672,540 B1 | 1/2004 | Shaheen et al. | |
|---|---|---|---|
| 7,152,496 B2 * | 12/2006 | Chen et al. | 74/89.26 |
| 2002/0104394 A1 * | 8/2002 | Manzanares et al. | 74/89.26 |

* cited by examiner

*Primary Examiner* — Justin Krause
*Assistant Examiner* — Gregory Prather
(74) *Attorney, Agent, or Firm* — Donna P. Suchy; Daniel M. Barbieri (57) ABSTRACT

An actuator assembly configured to control the movement of a stabilizer includes a ball screw having a longitudinal axis and configured to be rotated by a drive assembly, a primary nut assembly coupled to the stabilizer and received on the ball screw such that rotation of the ball screw causes movement of the primary nut assembly along the longitudinal axis of the ball screw, the ball screw and primary nut defining a primary load path between the between the drive means and the stabilizer, and a secondary nut assembly coupled to the primary nut assembly and configured to engage the ball screw upon failure of the primary load path. The secondary nut assembly comprising a split nut assembly having opposing halves extending about the ball screw, the split nut having at least one outer cam surface along the outer surface of one of the halves; and a secondary nut housing extending about the split nut; wherein upon failure of the primary load path, rotation of the outer cam surface is configured to move the split nut into locking engagement with the ball screw.

16 Claims, 8 Drawing Sheets

ACTUATOR ASSEMBLY FOR STABILIZERS

BACKGROUND

The present disclosure relates generally to actuators (e.g., horizontal stabilizer actuators for selectively controlling the operative position of aircraft horizontal stabilizers), and more specifically, to a locking mechanism intended to lock an actuator upon failure of a primary load path.

Modern aircraft typically utilize horizontal stabilizers located at the tail section of the fuselage or the rudder section that are pivotally supported relative to the airplane fuselage to "trim" the aircraft during flight by selective adjustment by the operator or pilot from an internal control unit or autonomously by a flight computer. This involves adjusting the position of the horizontal stabilizer by a stabilizer actuator to accommodate different load distributions within the aircraft and different atmospheric conditions such as wind, rain, snow, etc. In this regard, the horizontal stabilizer is traditionally pivotally connected to the rudder section or tail section of the fuselage at a point generally midway along its length.

SUMMARY

One embodiment relates to an actuator assembly configured to control the movement of a stabilizer, the actuator assembly comprising a ball screw having a longitudinal axis and configured to be rotated by a drive assembly; a primary nut assembly coupled to the stabilizer and received on the ball screw such that rotation of the ball screw causes axial movement of the primary nut assembly along the longitudinal axis of the ball screw, the ball screw and primary nut defining a primary load path between the between the drive means and the stabilizer; and a secondary nut assembly coupled to the primary nut assembly and configured to engage the ball screw upon failure of the primary load path; the secondary nut assembly comprising a split nut assembly having opposing halves extending about the ball screw, the split nut having at least one outer cam surface along the outer surface of one of the halves; and a secondary nut housing extending about the split nut; wherein upon failure of the primary load path, rotation of the outer cam surface is configured to move the split nut into locking engagement with the ball screw.

Another embodiment relates to an actuator assembly comprising a drive assembly; a ball screw configured to be rotated by the drive assembly; a primary nut assembly configured to engage the ball screw and move along the ball screw when the ball screw rotates, the primary nut assembly providing a primary load path to between the ball screw and a stabilizer; and a secondary nut assembly configured to engage the ball screw upon failure of the primary load path, the secondary nut assembly comprising a secondary nut housing; a split nut assembly having first and second opposing portions; a plurality of spring members provided between the first and second portions and tending to separate the first and second portions; and a plurality of rollers provided between each of the first and second portions and the secondary nut housing; wherein upon failure of the primary load path and application of a rotational force to the ball screw, the first and second portions rotate within the secondary nut housing to a locked position.

Another embodiment relates to an actuator assembly comprising a first nut assembly coupled to a ball screw and configured to move along the ball screw when the ball screw rotates; and a second nut assembly configured to engage the ball screw upon failure of a primary load path between the ball screw and a stabilizer, the second nut assembly comprising a plurality of rollers and a split nut assembly having a plurality of cam surfaces, wherein relative rotation between the second nut assembly and the ball screw after failure of the primary load path tends to move the cam surfaces along the plurality of rollers until further rotation of the ball screw is prevented by engagement of the cam surfaces and the rollers (e.g., through loading or actuation of the split nut assembly).

BRIEF DESCRIPTION OF THE DRAWINGS

The invention will become more fully understood from the following detailed description, taken in conjunction with the accompanying drawings, wherein like reference numerals refer to like elements.

DETAILED DESCRIPTION OF EXEMPLARY EMBODIMENTS

The present disclosure is directed generally to trimmable horizontal stabilizers that may be controlled via the use of actuators. Trimmable horizontal stabilizer actuators often consist of a primary ball nut assembly connected to an actuating drive gimbal which is pivotally connected to one end of the horizontal stabilizer structure. The ball nut assembly includes a ball nut housing, and a rotatable ballscrew that extends axially and vertically through the ball nut housing and a drive gimbal housing. The ball nut housing is connected to the drive gimbal housing by a trunnion segment. The ballscrew, in turn, has its upper end remote from the actuating drive gimbal and is fixed from translation or axial movement by a connection to a second, support gimbal which is pivotally secured to the rudder section or the tail section. As the ballscrew is rotated, the drive gimbal will be moved in translation relative to it. Thus, as the ballscrew is rotated in one direction, the leading edge of the horizontal stabilizer is pivoted upward, whereas by rotating the ballscrew in the other direction, the leading edge of the horizontal stabilizer is pivoted downward. Rotation of the ballscrew is routinely done by a motor and associated gearing which is connected to the second, fixed support gimbal and which may be actuated by the operator or pilot by an internal control unit. The connection of the stabilizer actuator to the stabilizer is typically located within the rudder or fuselage tail section and not directly in the air stream.

The horizontal stabilizer movement, as controlled by the operator, is transmitted by the ballscrew through the actuating drive gimbal by way of the primary ball nut assembly which defines a primary load path. The movement has a load with tensile and compressive components as well as a torque component due to the ballscrew thread lead. Failures of the primary load path caused by, for example, the shearing off of the connecting trunnion segment or by the loss of nut ball members from the ball nut assembly can result in the complete loss of control of the horizontal stabilizer. However, stabilizer actuators may be provided with a secondary load path for alternate control of the stabilizer. In such structures, the primary load path is normally controllably actuated by the operator and is thus under load while the secondary load path is normally unloaded and thus unactuated. In the event of a primary load path failure, some actuator systems may provide for a secondary load path that is automatically mobilized, or loaded, such that the stabilizer actuator can continue to be controllably actuated by the operator or pilot by the internal control unit to control the position of the stabilizer.

However, the transition of control to the secondary load path can occur quite rapidly such that failure of the primary load path may not necessarily be detected by the operator or pilot. In the event of a subsequent failure of the secondary load path through continued, periodic use, control of the stabilizer may be completely lost which could result in erratic, oscillatory movement of the stabilizer whereby the ability of the pilot or operator to control the aircraft could be substantially inhibited. Various embodiments discussed herein may be utilized to address this problem and minimize problems associated with failures of the primary load paths of stabilizer actuators by locking the actuator upon failure of the primary load path. For example, according to some embodiments disclosed herein, in the event of a primary load path failure, a secondary load path is automatically loaded, resulting in activation of a secondary ball nut assembly, which causes the actuator to lock and/or jam, in turn resulting in an inability to drive the secondary ball nut assembly. Such an event may be detected by a system monitoring computer that announces such a failure to a pilot, such that removal, repair, and/or maintenance of the actuator may be accomplished in a timely fashion.

Figure 1:
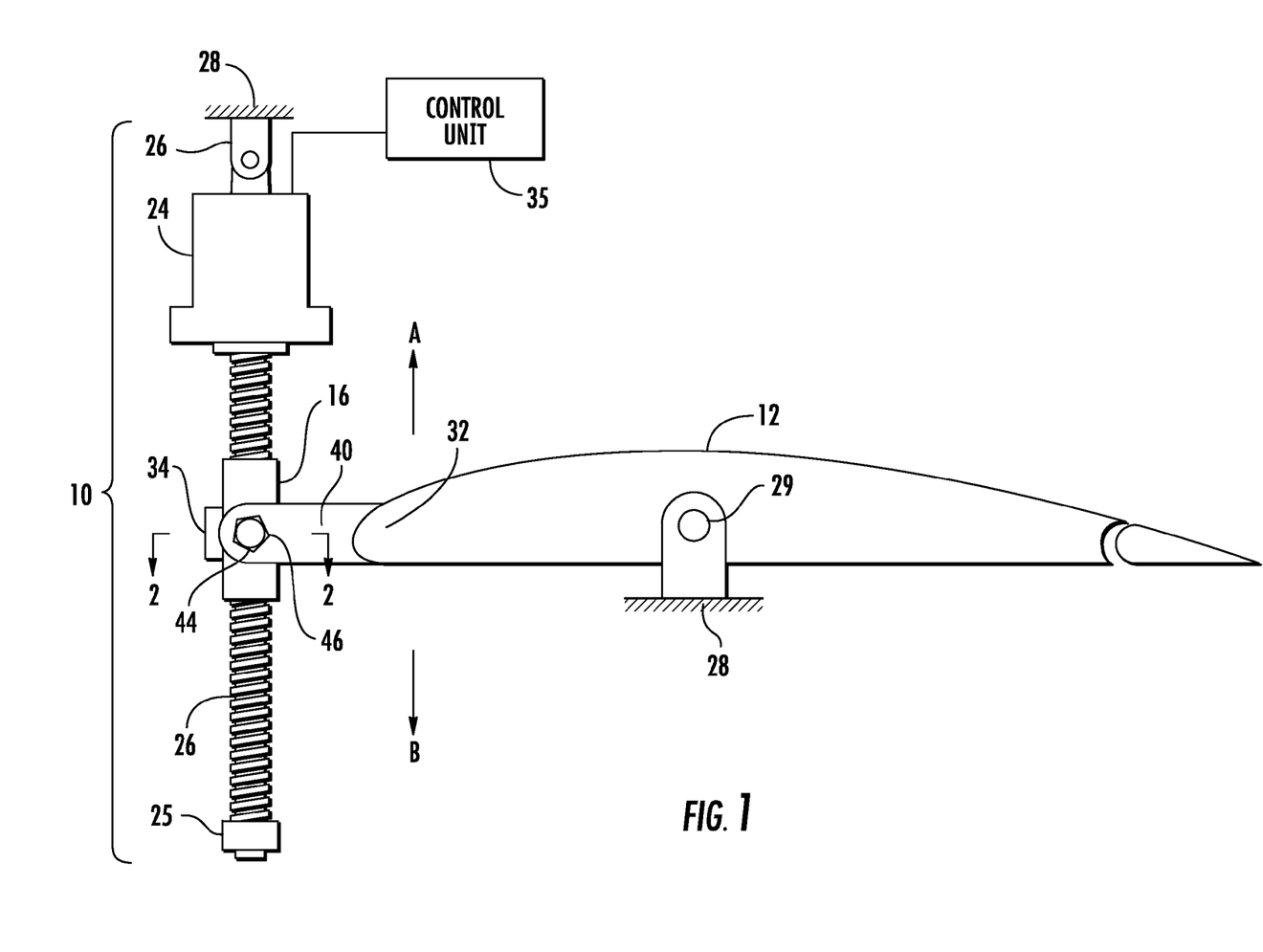
FIG. 1 is a schematic representation of a horizontal stabilizer and a stabilizer actuator according to an exemplary embodiment.
Figure 2:
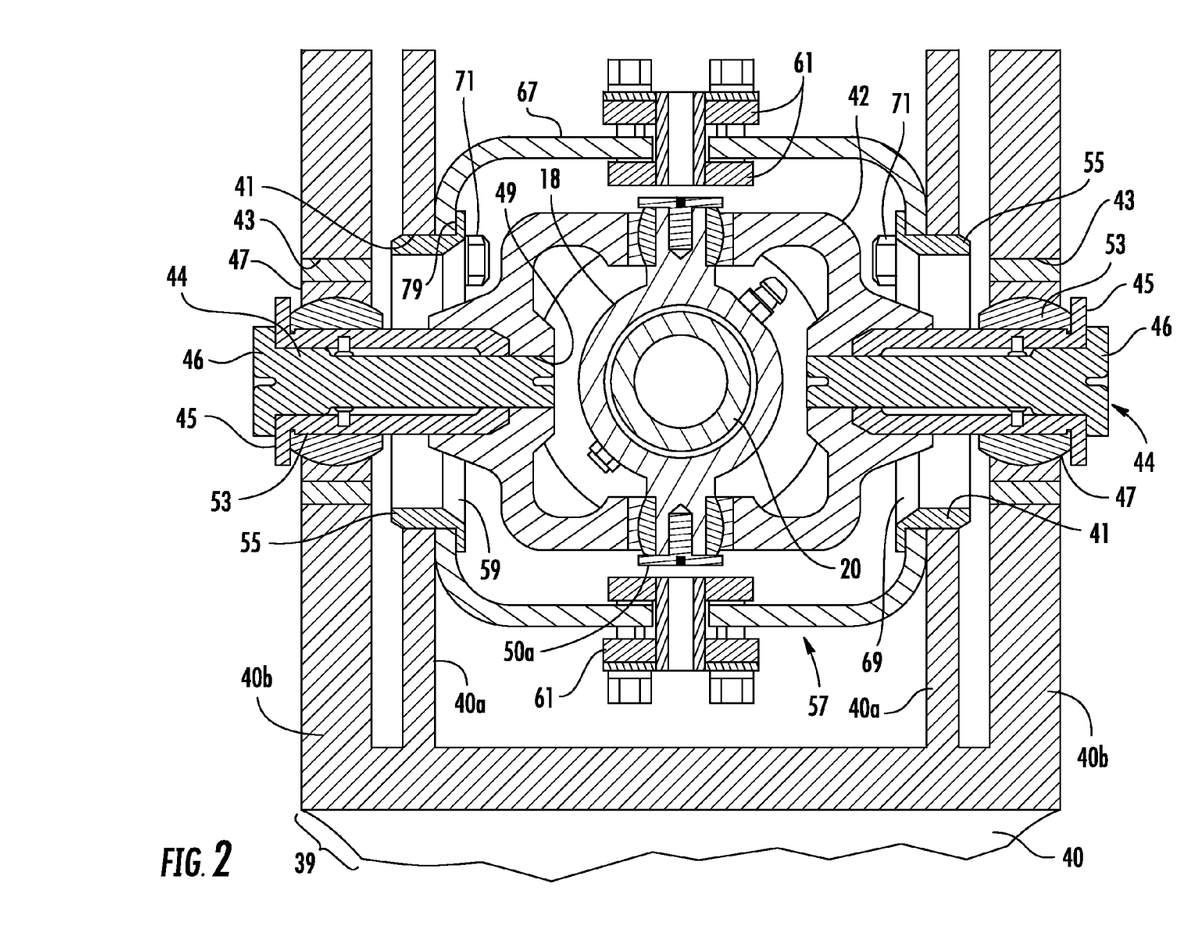
FIG. 2 is a cross-sectional view of a portion of an actuator assembly taken along section 2-2 of FIG. 1 according to an exemplary embodiment.

Referring now to FIGS. 1 and 2, a stabilizer actuator 10 (e.g., an actuator assembly, etc.) is shown according to an exemplary embodiment. Actuator 10 may be configured for selectively controlling the position of a horizontal stabilizer 12 (e.g., a control surface, etc.). Actuator 10 includes a primary load path that transfers loads between a drive assembly 24 (e.g., a hydraulic or electric drive motor and/or associated gearing, etc.), a primary ball nut assembly 16, and stabilizer 12 (e.g., a control surface, etc.). Primary ball nut assembly 16 includes a ball nut housing 18 connected by threads to a ballscrew 20 via a plurality of nut ball members (see FIG. 7). Ballscrew 20 extends generally vertically and is connected at its upper end to drive assembly 24. An end cap 25 is fixed to the opposite end of ball screw 20 to assure that ballscrew 20 will not be unthreaded from the primary ball nut assembly 16. Drive assembly 24 is connected to an upper support gimbal 26 which in turn is pivotally secured at a fixed position to a portion of a rudder section or tail section 28 of an aircraft fuselage. Drive assembly 24 may include a variety of motors and/or drives (e.g., hydraulic, electric, drives, motors, etc,), and include any necessary gearing, etc.

Horizontal stabilizer 12 is pivotally connected along its length by a pivot structure 29 which is fixed to, for example, a rudder section or fuselage tail section 28. A forward end 32 of horizontal stabilizer 12 is in turn pivotally connected to an actuating drive gimbal 34 via a connecting arm 40. Drive gimbal 34 is located along ballscrew 20 and is pivotally connected to primary ball nut assembly 16.

In order to selectively set the position of horizontal stabilizer 12, a pilot, through operation of an internal control unit 35, may energize drive assembly 24 to rotate ballscrew 20 in one direction which will move primary ball nut assembly 16 and drive gimbal 34 upward along ballscrew 20 to pivot forward end 32 of stabilizer 12 upward. Alternatively, ballscrew 20 may be rotated in the opposite direction which will move primary ball nut assembly 16 and drive gimbal 34 downward along ballscrew 20 to pivot forward end 32 of stabilizer 12 downward. As stabilizer 12 moves, stabilizer actuator 10 is pivoted at fixed support gimbal 26 and at movable drive gimbal 34 to accommodate the angular, arcuate displacement of forward end 32 of stabilizer 12.

Referring now to FIG. 2, a U-shaped connecting arm 40 connects stabilizer 12 to a primary ball nut assembly 16 and includes two pairs of spaced inner and outer plates 40a and 40b, respectively. The generally U-shaped configuration of connecting arm 40 is defined by the connection of both pairs of plates 40a and 40b as generally shown at connection 39. Inner plates 40a are provided with large diameter through bores 41, while outer plates 40b are provided with smaller diameter through bores 43. Spherical bearings 47 are located in bores 43 in outer plates 40b Annular rings 55 of pivot connectors 69 are rotatably supported in large diameter bores 41, while support rod assemblies 44 are rotatably supported in spherical bearings 47 by engagement with sleeves 53.

To assemble gimbal pivot connectors 69 and hence secondary gimbal member 67 to connecting arm 40, fasteners 71 are removed such that pivot connectors 69 can be located inwardly with the rings 55 in clearance with the inner surfaces of inner plates 40b of connecting arm 40. At the same time, support rod assemblies 44 are not yet assembled to the drive gimbal housing 42. Now, secondary gimbal members 67 can be moved into the opening of connecting arm 40 and gimbal pivot connectors 69 can be secured by fasteners 71 with gimbal rings 55 located in bores 41. Next, support rod assemblies 44 can be extended through bearings 47 in outer plates 40b with a connecting bolt 46 threaded into a bore 49 in primary gimbal housing 42. Sleeve 53 is supported in bearing 47 and extends into a counterbore adjacent threaded bore 49. At the same time, flanges 45 at the outer end of sleeves 53 are adapted to overengage the outer ends of spherical bearings 47 to assist in maintaining bearings 47 in bores 43.

The primary load path extends from drive assembly 24, to primary ball nut assembly 16, and in turn to stabilizer 12 via primary gimbal housing 42. As discussed in further detail below, a secondary load path, which becomes mobilized, or loaded, upon failure of the primary load path, extends from drive assembly 24, to a secondary ball nut assembly 38, and in turn to stabilizer 12 via secondary gimbal member 67 (which is further connected to secondary ball nut assembly 38 via yoke assembly 56, shown in greater detail in FIG. 3). It should be noted that with respect to the various connections of the gimbal housings, support rod assemblies 44, and connecting arm 40, those details not necessary for an understanding of the present disclosure may be omitted for simplicity and clarity. Further, secondary nut assembly 38 may be operably connected to stabilizer 12 via any suitable means to provide a secondary load path (e.g., via extension tubes, gimbals, secondary aircraft structures, etc.), as discussed in further detail herein.

Figure 3:
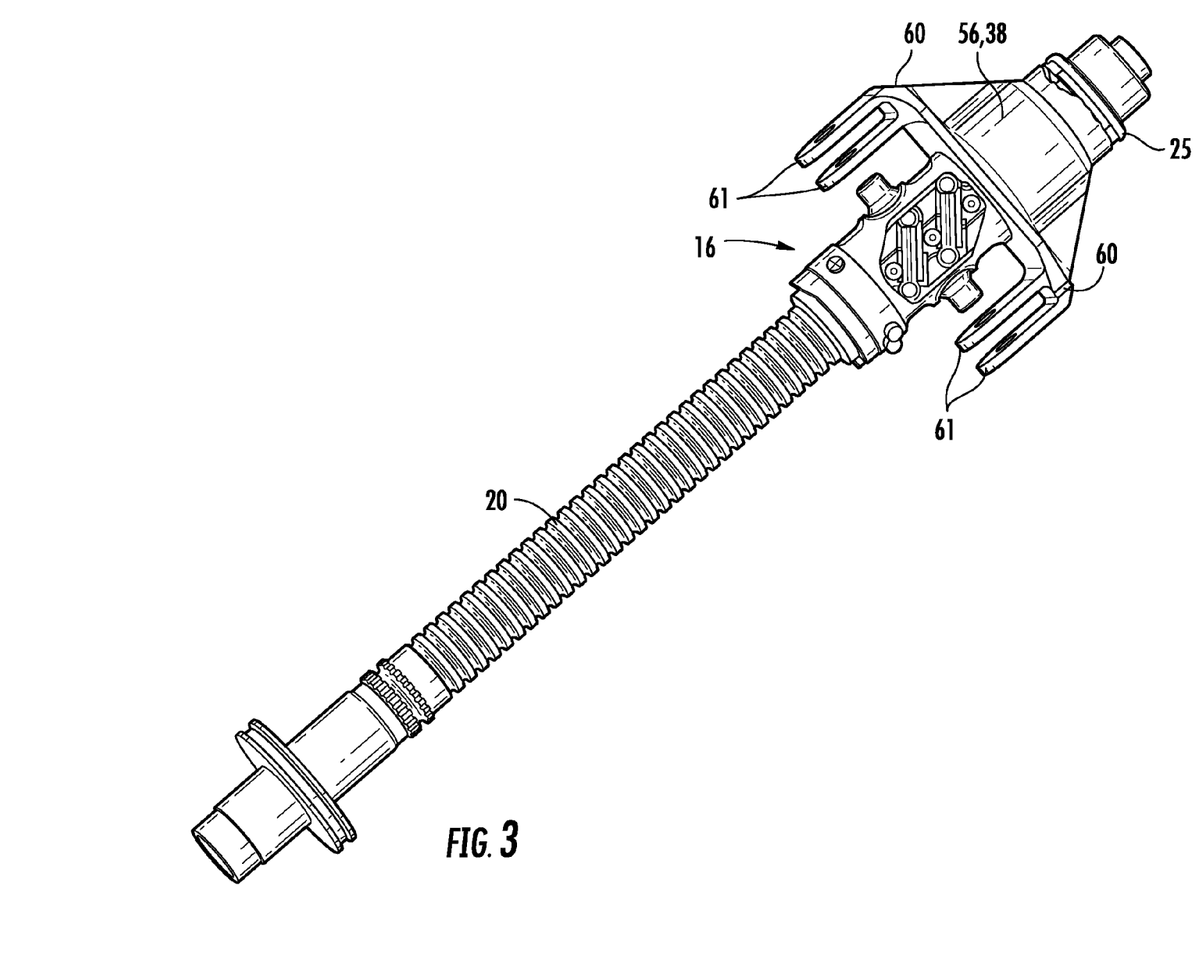
FIG. 3 is a perspective view of a portion of an actuator assembly according to an exemplary embodiment.

Referring to FIGS. 2-3, a secondary yoke 56 is connected to secondary gimbal ring housing 57 via pair of extensions 60, each extension 60 including two legs 61 (see FIG. 2) that are coupled to secondary gimbal ring housing 57. A secondary nut assembly 38 is operably supported in the secondary yoke 56 (see FIG. 4) and forms part of the secondary load path that is mobilized should the primary load path fail.

Figure 4:
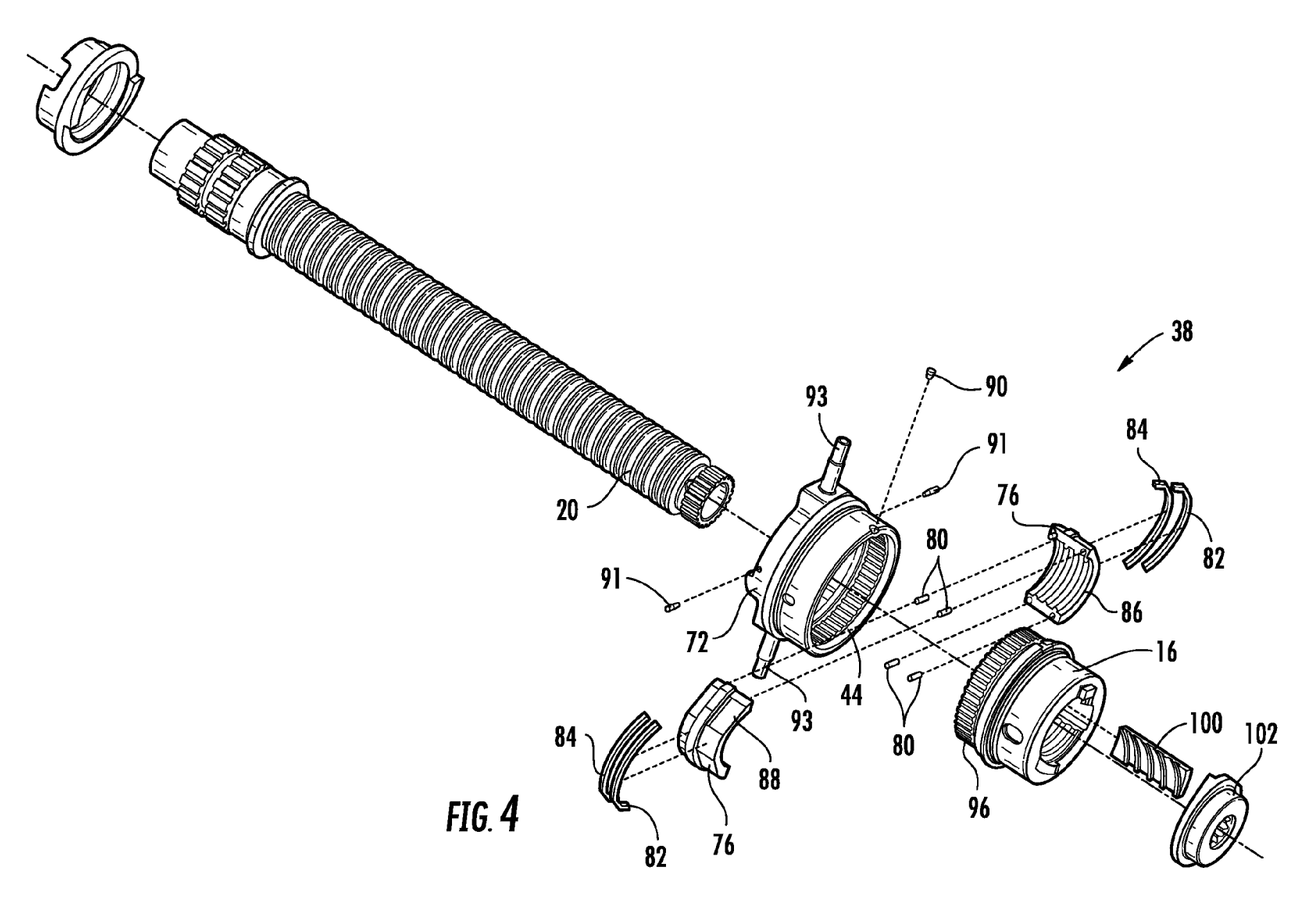
FIG. 4 is an exploded perspective view of a portion of an actuator assembly according to an exemplary embodiment.

Referring to FIGS. 4-8, various components of actuator 10 and secondary nut assembly 38 will be described in greater detail. As shown in FIG. 4, secondary nut assembly 38 includes a secondary nut housing 72 that includes one or more splines or spline members 94 that are configured to engage corresponding spline members 96 provided on primary nut housing 18. Primary nut assembly 16 includes a ball return section 100 and an end portion 102. Secondary nut housing 72 may be generally cylindrical in shape and may include a pair of trunnions 93 extending outward from the main portion of secondary housing 72. Secondary nut assembly 38 also includes a split nut assembly 74, which includes two opposing split nut portions 76, 78 having generally semi-circular shapes, and a number of spring members 80 (e.g., separating springs, etc.) that are configured to maintain a separation between portions 76, 78 during normal operation of actuator 10. In one embodiment, four spring members 80 are provided between portions 76, 78, although according to various alternative embodiments, more or fewer spring members 80 may be used.

Figure 5:
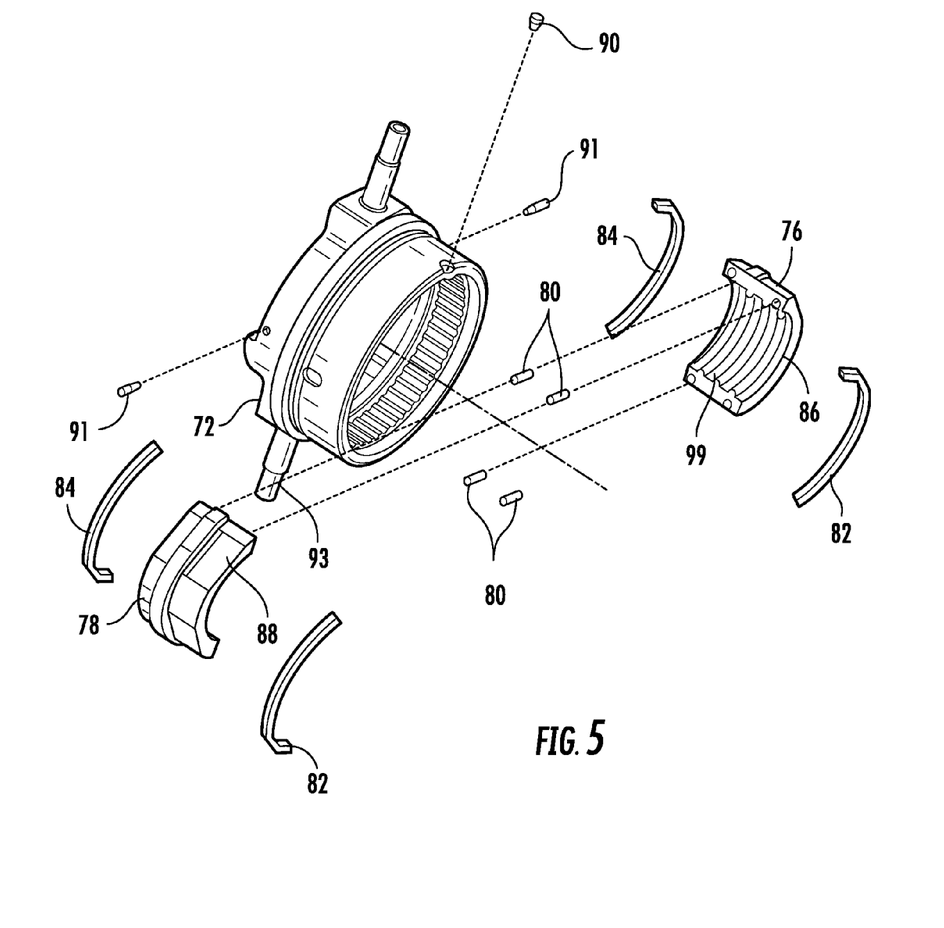
FIG. 5 is a an exploded perspective view of a portion of a secondary ball nut assembly according to an exemplary embodiment.
Figure 6:
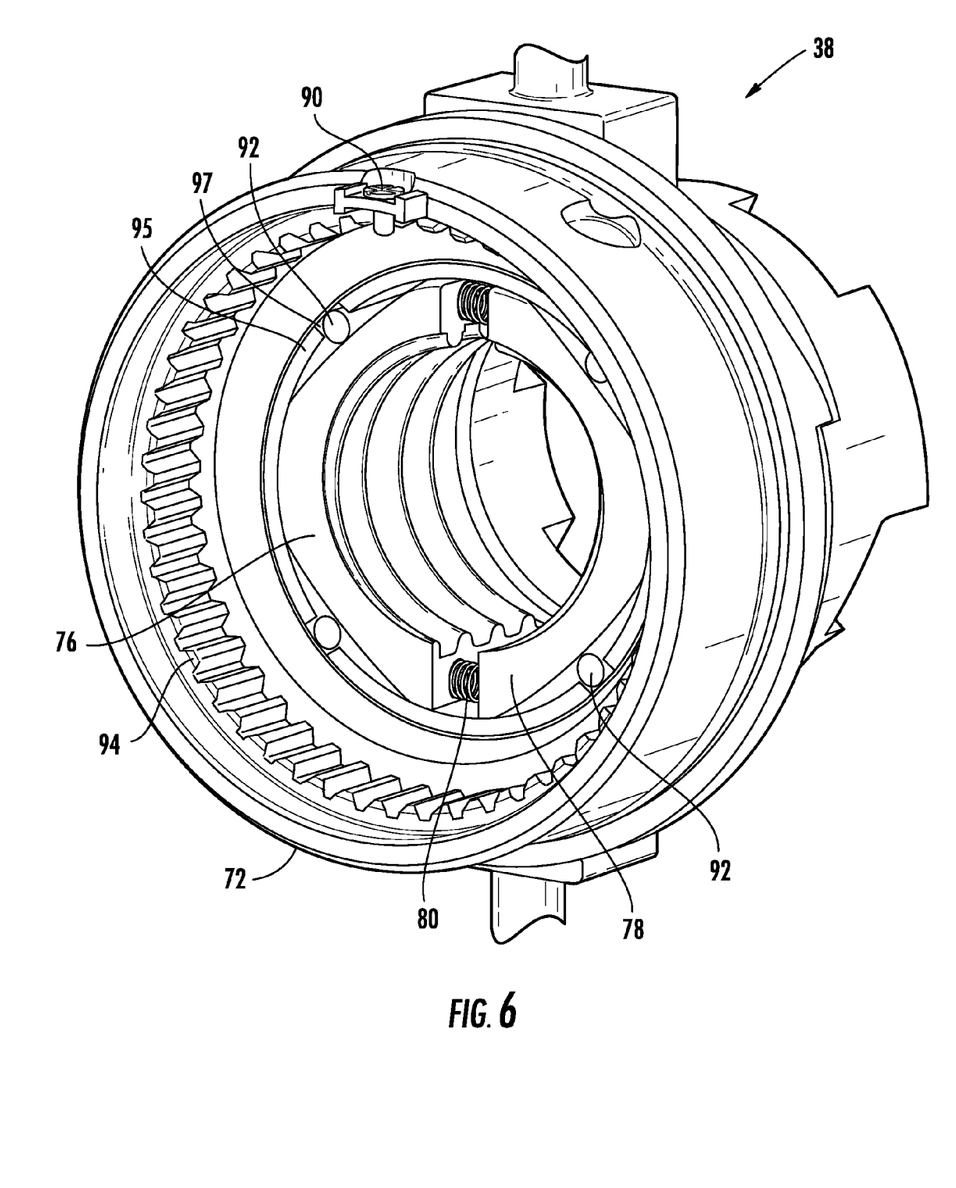
FIG. 6 is a perspective view of a secondary nut assembly according to an exemplary embodiment.

Referring further to FIGS. 4-8, one or more split rings 82, 84 may be provided to reduce the friction between split nut assembly 74 and adjoining components. In one embodiment, split rings 82, 84 are made from a Teflon material, and a single split ring 82 or 84 is provided to each side of split nut assembly 74. Secondary nut assembly 38 may further include one or more shear members 90, 91 (shear pins, etc.) configured to prevent relative movement between components during normal operation of actuator 10. As shown in FIGS. 5-6, one shear member 90 may extend through secondary nut housing 72 and into primary nut housing 18 (not shown in FIG. 6) to prevent relative axial movement between primary nut housing 18 and secondary nut housing 72 during normal operation of actuator 10. Further, a pair of shear members 91 may extend through secondary housing 18 and into portions 76, 78 of split nut assembly 74, preventing rotation of portions 76, 78 relative to secondary nut housing 72 during normal operation of actuator 10. A number of roller members 92 are provided between portions 76, 78 and secondary nut housing 72 (see FIG. 8).

Referring further to FIGS. 4-5, portions 76, 78 of split nut assembly 74 each include an engagement surface 86. In one embodiment, split nut assembly 74 is an inverted split nut, such that engagement surface 86 includes raised portions 99 that are configured to be received within a corresponding thread trough 98 of ballscrew 20. According to an exemplary embodiment, engagement surface 86 is formed so as to provide a gap between portions 76, 78 and ballscrew 20 during normal operation of actuator 10 (see FIG. 7), and to provide a frictional fit between portions 76, 78 and ballscrew 20 upon failure of the primary load path.

Figure 7:
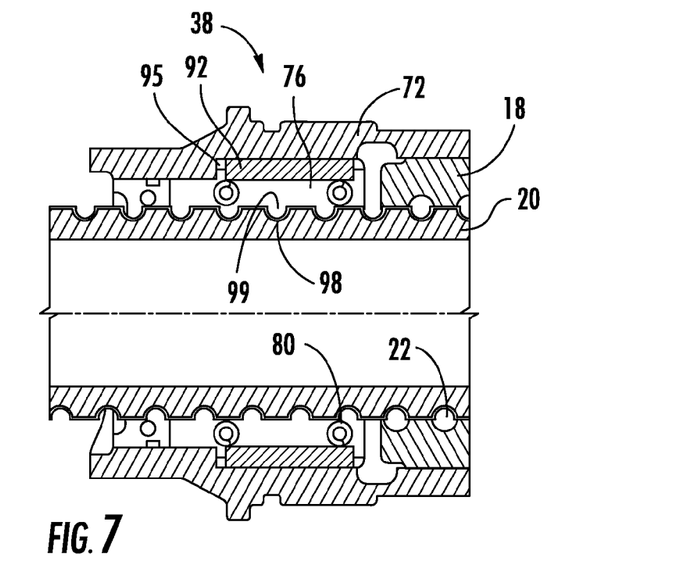
FIG. 7 is a cross-sectional view of a portion of an actuator assembly taken along a longitudinal axis of a ball screw according to an exemplary embodiment.
Figure 8:
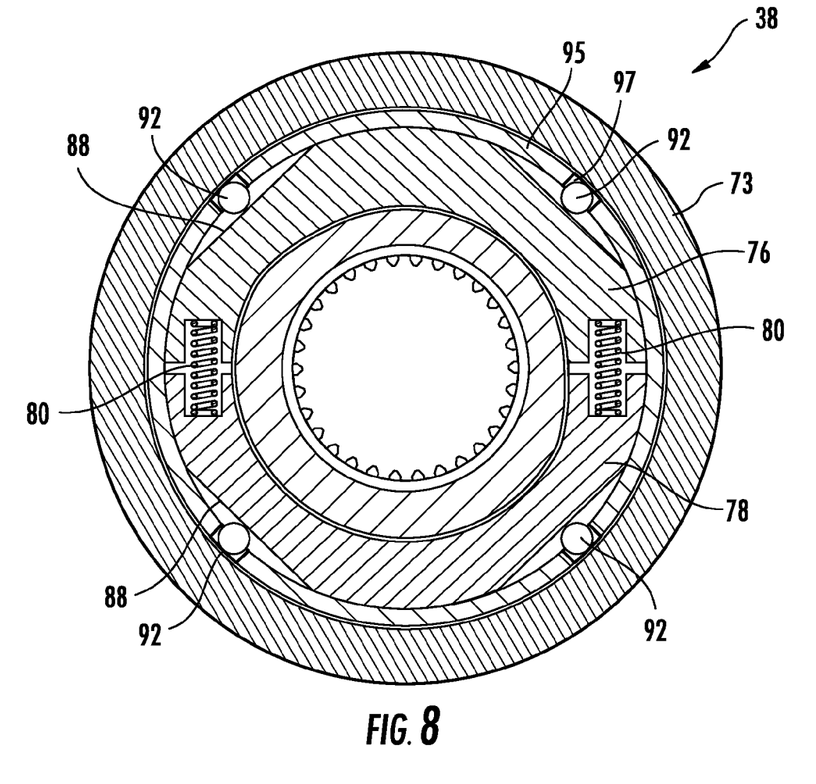
FIG. 8 is a cross-sectional view of a portion of an actuator assembly taken transverse to a longitudinal axis of a ball screw according to an exemplary embodiment.

Referring now to FIGS. 7-8, cross-sectional views of secondary nut assembly 38 are provided to further illustrate various features of actuator 10. As shown in FIG. 7, primary nut housing 18 is received on ball screw 20 and relative rotation between the components is provided by ball members 22, which travel in corresponding troughs in both ball screw 20 and primary nut housing 18. As indicated above, portions 76, 78 of split nut assembly 74 are separated from ball screw 20 by springs 80, permitting free rotation of ballscrew 20 relative to split nut assembly 74 during normal operation of actuator 10.

Upon failure of the primary load path (due to e.g., failure of the primary nut assembly, a connecting trunnion, loss of ball members, etc.), a load may be placed on the secondary load path (e.g., as a result of aerodynamic forces acting on stabilizer 12, or as a result of operation of drive assembly 24, etc.) sufficient to shear member 90 and to load the secondary load path. In either case, ballscrew 20 engages portions 76, 78 of split nut assembly 74, and the frictional fit between raised portions 99 of portions 76, 78 and trough 98 of ball screw 20 generate a rotational force, or torque, upon split nut assembly 74. With sufficient torque or rotational force applied, shear members 91 shear, permitting portions 76, 78 to rotate within secondary housing 38. As shown in FIG. 8, as portions 76, 78 rotate, one or more of cam surfaces 88 move relative to roller members 92. As portions 76, 78 continue to rotate, a wedging effect between secondary nut housing 72, rollers 92, and portions 76, 78 increases, forcing portions 76, 78 toward each other and thereby increasing the frictional resistance between split nut assembly 74 and ball screw 20. Upon application of sufficient force, split nut assembly 74 will lock, or jam, in position with ballscrew 20.

It should be noted that as shown in FIG. 8, portions 76, 78 (having cam surfaces 88 (e.g., outer cam surfaces, flat surfaces, etc.)), roller members 92, and secondary nut housing 38 are configured such that a rotational force in either direction will actuate the locking effect of split nut assembly 74. Upon locking of the actuator via mobilization of secondary nut assembly 38, a signal may be sent to an operator (e.g., a pilot), indicating that a failure in the primary load path has occurred. Because the actuator is locked in position upon failure of the primary load path, undesirable movement in stabilizer 12 that may otherwise occur may be prevented.

Figure 9:
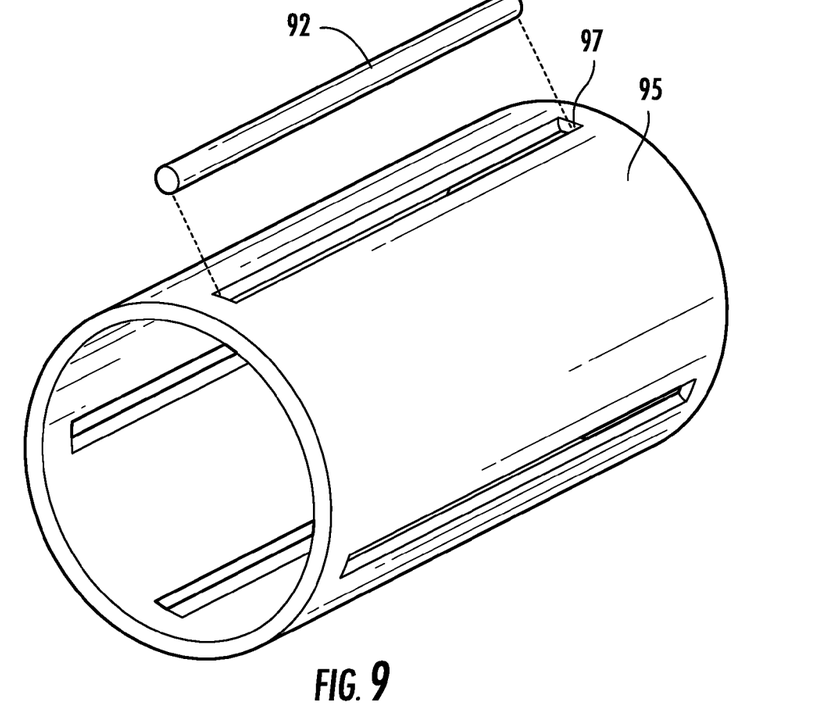
FIG. 9 is a perspective view of a cage member according to an exemplary embodiment.

Referring to FIGS. 8-9, according to an exemplary embodiment, secondary nut assembly 38 includes a cage member 95 (e.g., a guide member, a locating member, an alignment member, etc.). Cage member 95 may be a generally cylindrical member provided with a plurality of slots 97. Slots 97 are positioned along the circumference of cage member 95 to correspond to the positions of roller members 92. Each slot 97 is also appropriately sized to contain a single roller member 92. Cage 95 and slots 97 serve to maintain the relative positions of the various roller members 92 such that as portions 76, 78 of split nut assembly 74 rotate, the positions of roller members 92 is substantially the same on each flat 88, in turn providing a generally consistent compressive force about split nut assembly 74. More or fewer slots 97 may be provided, depending on the number of roller members 92 utilized. Further, the size and/or shape of slots 97 may be varied to accommodate various shapes and sizes of roller members 92.

Figure 10:
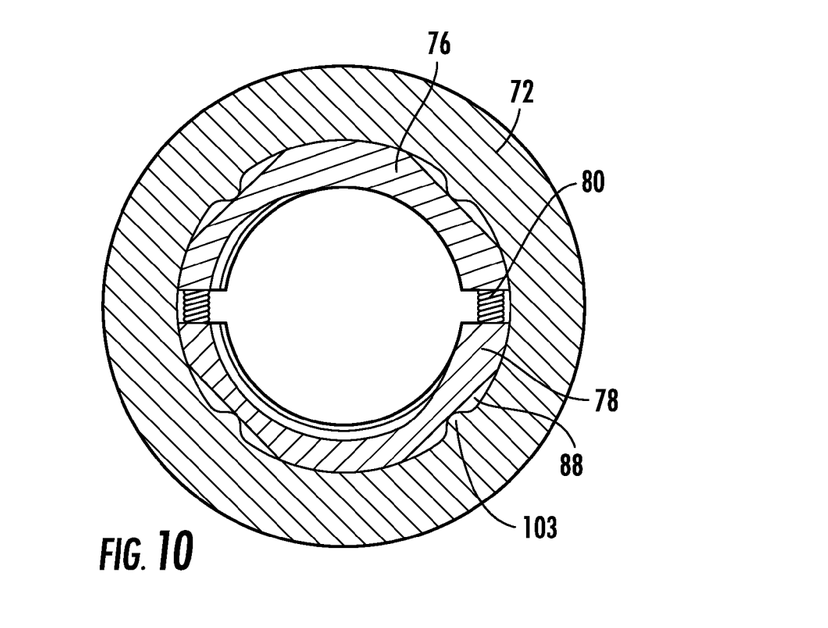
FIG. 10 is a cross-sectional view of a portion of an actuator assembly taken transverse to a longitudinal axis of a ball screw according to another exemplary embodiment.

Referring now to FIG. 10, according to an alternative exemplary embodiment, split nut assembly 38 may utilize raised portions 103 that are integrally formed or machined as part of secondary nut housing 72 instead of roller members 92 and/or cage member 95. As shown in FIG. 10, as portions 76, 78 of split nut assembly 74 rotate, a wedging action between raised portions 103 and cam surfaces 88 on portions 76, 78 forces portions 76, 78 toward each other, thereby locking secondary nut assembly 38 to ball screw 20 in a similar manner to that discussed above in connection with roller members 92 and cage member 95. Raised portions 103 may be provided in any suitable size and shape, and may be made from any suitable material (e.g., a bearing material such as a stainless steel, etc.).

In some embodiments, an actuator assembly provides both a primary load path and a secondary load path for receiving a load associated with control of a control surface or other component. During normal operation of the actuator assembly, only the primary load path is loaded, and the secondary load path is unloaded, and not actuated. Upon a failure of the primary load path, the secondary load path is automatically loaded, resulting in locking of the actuator assembly. Locking of the actuator assembly may result in a notification being generated (e.g., by a computer control unit, etc.) indicating that a failure in the primary load path has occurred and that the actuator is not operable.

In further embodiments, the actuator assembly and/or the secondary nut assembly described herein may be utilized in a wide variety of applications in addition to those involving horizontal stabilizers, such as flap control, etc., or any other suitable application where an actuator or other assembly having a secondary nut assembly such as that described herein may be utilized. Further, the actuator assembly and/or secondary nut assembly may be used in a variety of non-aircraft applications where locking of a secondary nut assembly and a ball screw may be desirable. The present application is intended to be applicable to all such applications.

The actuator assembly disclosed herein may provide various advantages over more conventional designs. For example, the secondary nut assembly provides a compact solution that addresses primary load path failures by locking the actuator based on torque (e.g., radial wedging) rather than conventional designs that typically require a constant unidirectional axial load to ensure effectiveness of a secondary load path (e.g., a secondary nut). Further the actuator assembly minimizes backlash of the actuator upon locking, such that in one embodiment, total backlash of the actuator assembly upon engagement of the secondary nut assembly is less than 0.042 inches, with no more than 0.026 inches being attributable to the secondary nut assembly. In other embodiments, the backlash of the actuator and/or the backlash attributable to the secondary nut assembly may vary according to component tolerances, component sizes, etc. Further yet, because the frictional torque generated by the secondary nut assembly is proportional to the input torque provided by the drive assembly, the present actuator can be utilized with a variety of drive assemblies (e.g., motors, etc.) operating with a wide range of motor torques.

It is important to note that the construction and arrangement of the elements of the actuator assembly as shown in the exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the embodiments. For example, for purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. Such joining may also relate to mechanical, fluid, or electrical relationship between the two components. Accordingly, all such modifications are intended to be included within the scope of the present disclosure as defined in the appended claims. The order or sequence of any process or method steps may be varied or re-sequenced according to alternative embodiments. Other substitutions, modifications, changes, and/or omissions may be made in the design, operating conditions, and arrangement of the exemplary embodiments without departing from the spirit of the present disclosure.

What is claimed is:

1. An actuator assembly configured to control the movement of a stabilizer, the actuator assembly comprising:
   a ball screw having a longitudinal axis and configured to be rotated by a drive assembly;
   a primary nut assembly coupled to the stabilizer and received on the ball screw such that rotation of the ball screw causes movement of the primary nut assembly along the longitudinal axis of the ball screw, the ball screw and the primary nut assembly defining a primary load path between the between the drive assembly and the stabilizer; and
   a secondary nut assembly coupled to the primary nut assembly and configured to engage the ball screw upon failure of the primary load path; the secondary nut assembly comprising:
      a split nut assembly having opposing halves extending about the ball screw, the split nut assembly having at least one outer cam surface along an outer surface of each one of the halves; and
      a secondary nut housing extending about the split nut assembly;
   wherein upon failure of the primary load path, further rotation of the ball screw causes rotation of the at least one outer cam surface relative to the secondary nut housing, thereby moving the opposing halves of the split nut assembly toward each other and the ball screw, and subsequently moving the split nut assembly into locking engagement with the ball screw.

2. The actuator assembly of claim 1, further comprising at least one first shear member configured to prevent rotation of the split nut assembly relative to the secondary nut housing prior to failure of the primary load path and to shear upon failure of the primary load path, and at least one second shear member configured to prevent relative axial movement between the primary nut assembly and the secondary nut assembly prior to failure of the primary load path and to shear upon failure of the primary load path.

3. The actuator assembly of claim 2, wherein the halves of the split nut assembly each includes an inner engagement surface configured to frictionally engage an outer surface of the ball screw upon failure of the primary load path.

4. The actuator assembly of claim 3, further comprising at least one rolling member provided between the at least one outer cam surface and the secondary nut housing, wherein application of a rotational force to the ball screw via the drive assembly tends to move the split nut assembly into locking engagement with the ball screw.

5. The actuator assembly of claim 4, wherein application of the rotational force to the ball screw tends to move the split nut assembly into locking engagement with the ball screw independent from the direction of rotation of the ball screw.

6. The actuator assembly of claim 5, wherein a locking force between the split nut assembly and the ball screw increases as the ball screw rotates.

7. The actuator of claim 1, wherein the primary nut assembly is coupled to the secondary nut assembly via a plurality of splines.

8. The actuator assembly of claim 1, wherein a roller is provided between the at least one outer cam surface and the secondary nut housing.

9. The actuator assembly of claim 8, wherein the at least one outer cam surface comprises generally flat surfaces provided on the exterior surface of the split nut halves.

10. The actuator assembly of claim 1, further comprising a plurality of spring members configured to maintain separation between the split nut assembly and the ball screw prior to failure of the primary load path.

11. An actuator assembly comprising:
   a drive assembly;
   a ball screw configured to be rotated by the drive assembly,
   a primary nut assembly configured to engage the ball screw and move along the ball screw when the ball screw rotates, the primary nut assembly providing a primary load path to between the ball screw and a stabilizer; and
   a secondary nut assembly configured to engage the ball screw upon failure of the primary load path, the secondary nut assembly comprising:
      a secondary nut housing;
      a split nut assembly having first and second opposing portions;
      a plurality of spring members provided between the first and second portions and tending to separate the first and second opposing portions; and
      a plurality of rollers provided between each of the first and second opposing portions and the secondary nut housing;
   wherein upon failure of the primary load path, application of a rotational force to the ball screw causes the first and second opposing portions to rotate within the secondary nut housing and toward each other to a locked position.

12. The actuator assembly of claim 11, further comprising a plurality of shear pins that prevent rotation of the split nut relative to the secondary nut housing, wherein the shear pins are configured to shear upon failure of the primary load path and application of a rotational force to the ball screw.

13. The actuator assembly of claim 12, further comprising a second shear pin that prevents axial movement between the primary nut assembly relative to the secondary nut assembly, wherein the second shear pin is configured to shear upon application of an axial load.

14. The actuator assembly of claim 11, wherein the first and second portions each includes a cam surface that engages one of the plurality of rollers.

15. The actuator assembly of claim 14, wherein each of the cam surfaces is a substantially flat surface.

16. The actuator assembly of claim 11, wherein upon failure of the primary load path and application of a rotational force, the split nut rotates within the secondary nut housing to a locked position when the rotational force is in a first rotational direction or when the rotational force is in a second rotational direction opposite the first rotational direction.

* * * * *